(12) United States Patent
Creeger et al.

(10) Patent No.: US 6,581,324 B1
(45) Date of Patent: Jun. 24, 2003

(54) METHOD OF CONTROLLING PESTS AND ASSOCIATED APPARATUS

(76) Inventors: Samuel M. Creeger, 6306 Bartlett St., Pittsburgh, PA (US) 15217; Uri Fakiro, 1736 Wightman St., Pittsburgh, PA (US) 15217

( * ) Notice: Subject to any disclaimer, the term of this patent is extended or adjusted under 35 U.S.C. 154(b) by 0 days.

(21) Appl. No.: 10/118,768

(22) Filed: Apr. 9, 2002

Related U.S. Application Data

(63) Continuation-in-part of application No. 09/703,359, filed on Oct. 31, 2000, now Pat. No. 6,442,890.

(51) Int. Cl.[7] .............................. A01M 1/20; A01M 1/22
(52) U.S. Cl. ......................................... 43/131; 43/132.1
(58) Field of Search ........................... 43/107, 111, 112, 43/124, 131, 132.1

(56) References Cited

U.S. PATENT DOCUMENTS

| | | |
|---|---|---|
| 3,857,934 A | 12/1974 | Bernstein et al. |
| 3,864,468 A | 2/1975 | Hyman et al. |
| 4,160,335 A | 7/1979 | Von Kohorn et al. |

(List continued on next page.)

OTHER PUBLICATIONS

The Common Man's Micromachine? Researchers Cut the Cost of Tiny Gears and Motors by Using Standard Equipment, Georgia Institute of Technology, Jun. 26, 1991.
Introduction to MicroEngineering by Danny Banks 1 The Sands, Milton Under Wychwood, Oxon, UK 1999, pp. 38–42.
Wilkins, Stacey, (Jul. 13, 1999), Japanese Invent World's Tiniest Robot, CNN Interactive, [online], Available website: wysiwig://12/http://cnn.com/TECH/ptech/9907/13/japan–microrobot, Accessed on Jul. 15, 1999.

(List continued on next page.)

*Primary Examiner*—Charles T. Jordan
*Assistant Examiner*—Tara M Golba
(74) *Attorney, Agent, or Firm*—Arnold B. Silverman; Eckert Seamans Cherin & Mellott, LLC

(57) ABSTRACT

A method and apparatus for controlling ants and other pests are provided. A micromachine has a battery and a remotely actuatable electrical switch operatively associated therewith. The micromachine has at least a portion thereof covered by an ant attractant such as food or bait, for example. The micromachine is of such size and weight as to be readily transportable by a fire ant or carpenter ant or other pest. In one embodiment, a resistance heating element is energized by the battery when the switch is closed thereby causing communication between a recess containing a pheromone or fungus or other ant controllant substance and the exterior of the micromachine. In an alternate embodiment, a radio frequency transmitter will emit a signal to assist with location of the ant or pest nests and thereby permit action to be taken to control the ants. Vibration of the micromachine is preferably effected at intermittent periods. In further embodiments of the invention which are particularly advantageous in respect of rodent pests but are usable in connection with other pests, a micromachine may contain an explosive material which is detonated by the closing of a switch to permit a battery to energize a detonator. The switch may be remotely actuated as by a radio frequency signal or may in some instances, for example, when the micromachine has been ingested by the pest, be chemically activated as in a pH sensor or glucose sensor, for example. In other embodiments, odors which are attractants to pests may be released, neutralizing agents which neutralize the pest control material may be intermingled with the pest control material to neutralize the same and micromachines may be placed within tubes, boxes or other enclosures or an other article through which rodent pests may pass and pick up the micromachines with their grooming habits contributing to ingestion of the same. The micromachines may have transmitters which, when activated, will facilitate locating the device.

64 Claims, 11 Drawing Sheets

U.S. PATENT DOCUMENTS

| | | |
|---|---|---|
| 4,374,201 A | 2/1983 | Orlando et al. |
| 4,380,582 A | 4/1983 | Orlando et al. |
| 4,639,393 A | 1/1987 | Von Kohorn et al. |
| 4,666,767 A | 5/1987 | Von Kohorn et al. |
| 4,793,474 A | 12/1988 | Drake |
| 4,874,611 A | 10/1989 | Wilson |
| 5,057,315 A | 10/1991 | Gunner et al. |
| 5,057,316 A | 10/1991 | Gunner et al. |
| 5,182,879 A | 2/1993 | Hopkins |
| 5,189,831 A | 3/1993 | Miller et al. |
| 5,303,496 A | 4/1994 | Kowalkowski |
| 5,310,552 A | 5/1994 | Gunner et al. |
| 5,311,697 A | 5/1994 | Cavanaugh et al. |
| 5,400,543 A | 3/1995 | Ideker, Jr. |
| 5,427,784 A | 6/1995 | Gunner et al. |
| 5,452,540 A | 9/1995 | Dowd et al. |
| 5,527,531 A | 6/1996 | Linhart |
| 5,632,115 A | 5/1997 | Heitman |
| 5,649,423 A | 7/1997 | Sniegowski |
| 5,657,576 A | 8/1997 | Nicosia |
| 5,679,362 A | 10/1997 | Miller et al. |
| 5,718,078 A | 2/1998 | Therrien |
| 5,763,815 A | 6/1998 | Thomas et al. |
| 5,770,913 A | 6/1998 | Mizzi |
| 5,896,696 A | 4/1999 | Stokes et al. |
| 5,974,726 A | 11/1999 | Creeger et al. |
| 6,088,949 A | 7/2000 | Nicosia et al. |

OTHER PUBLICATIONS

Micromachine Center (May 27, 1999( [online], Available website: www.iijent.or.jp/MMC/, Accessed on Jul. 15, 1999.

Carson, Mary Kay (Oct. 5, 1998), Micromachines, Science World [online], v55(n3), Available website: drink.mnis–.net/current/index.cgi, Accessed on Jul. 9, 1999.

FMC Corporation, FMC Ant Identification Chart, (1995), (2–sided document), Princeton, New Jersey.

METHOD OF CONTROLLING PESTS AND ASSOCIATED APPARATUS

CROSS REFERENCE TO RELATED APPLICATION

This application is a continuation-in-part of U.S. Ser. No. 09/703,359 entitled "METHOD OF CONTROLLING PESTS AND ASSOCIATED APPARATUS" filed Oct. 31, 2000, now U.S. Pat. No. 6,442,890.

BACKGROUND OF THE INVENTION

1. Field of the Invention

The present invention relates to a method and apparatus for the control of pests, such as ants and bees and, more particularly, it relates to the use of micromachines at least partially covered by an attractant and having radio activated switch means which establish responsive battery activation of means which directly or indirectly initiate action to control the pests.

The present invention also relates to a method and apparatus for the control of pests, such as rats, mice, insects and other arthropods and more particularly, it relates to the use of micromachines containing a pest control material that will kill or otherwise mitigate or control pests, such as rats, mice, insects and other arthropods.

2. Description of the Prior Art

In addition to other pests, such as wasps and bees, there are approximately 10,000 species of ants worldwide. Depending on the species, they nest in the ground, in trees or in man-made structures. Ants feed upon everything humans do in addition to a variety of other items.

Ants can be beneficial in that they attack and kill pests of humans and agricultural crops, play a role in soil aeration, nutrient cycling and topsoil formation, pollinate certain plants, and are a source of human food in certain societies.

However, some ants are harmful to humans. Ants have been found to carry human disease organisms which they spread when they invade hospitals and walk on patients, patients' food and medical preparations. Ants also attack and destroy agriculturally important crops and animals, and reduce populations of native birds and reptiles. Certain ants also tunnel through trees and wooden structural members in homes causing serious structural damage.

All ants are social insects in that they live in colonies containing specialized groups of ants. These groups are the workers, the larvae, the queen, and the males. The queen controls the activities in the nest by emitting chemical signals to the members of the colony.

The workers are sterile females and are the most numerous members of the colony. They perform most of the work of the colony such as constructing the nest, gathering food, feeding other members of the nest, defending the nest, and cleaning the nest. The larvae are grub-like, immature ants that are constantly fed, groomed and protected by the worker ants until they develop into adult ants.

Due to their extremely narrow esophagus, the adult ants (the workers, queens, and males) are generally able to consume only liquid foods. The workers regurgitate some of the liquid food in their stomach to other members of the colony, including the queen. Sharing nourishment in this manner is called trophallaxis.

The larvae (in their later stages of development) are the only members of the colony that can consume solid food. The larvae are fed pieces of solid food which they digest. The larvae then exude certain secretions through their skin which are eagerly licked up by the workers. When the larvae have grown, they go through a period of change called metamorphosis, during which they change from their grub-like form to an adult ant.

After an ant colony has matured, some of the larvae metamorphose into winged, fertile females and males, in addition to workers (sterile females). At the appropriate time, these fertile females and males mate (either in the nest or outside the nest) and the fertilized female, now called a queen, seeks a suitable location to establish a new colony. The male dies shortly after mating. The queen will lay about a dozen eggs which she tends to and feeds until they have developed into adult ants. During this period, the queen does not leave the nest or gather food, but she lives on the nourishment from the stored fat and dissolving wing muscles in her body. She also feeds the first brood of developing larvae by regurgitating some liquid food to them. When the first adult ants hatch, they leave the nest to gather food for themselves and the queen. From this point on, the queen's only function is to increase the population of the nest by laying eggs. The nest grows in size and matures and the cycle is repeated when fertile females and males are produced.

The ability of ants to thrive under a variety of conditions and man's expansion into areas naturally inhabited by ants has brought ant and man into confrontation. Man has employed various means to control ants including pesticidal sprays, dusts, baits, pouring boiling water into an ant mound, and removing food sources. Most recently, use of pheromones to detrimentally alter the behavior of the ants, use of disease organisms to kill the members of the ant colony, and use of natural insect enemies of ants are being researched and used to control ants. The Florida Department of Agriculture released several thousand Brazilian phorid flies in an attempt to control the fire ant in Florida. However, even with the above control attempts over the years, ants continue to thrive and cause damage. A primary reason for this is that the ant colony, and in particular, the queen and developing larvae, being below ground, in a tree limb, or inside the wall of a home, are hidden from view and protected. In most cases, unless the queen and developing larvae are destroyed, the ant colony can regenerate to its pretreatment population levels in a short period of time. Therefore, the key to greater control of ants is being able to deliver an ant-controlling substance deep into the nest where the queen and developing larvae reside or being able to locate the queen and developing larvae so they can be treated and eliminated by conventional means, such as spraying with an insecticide.

The fire ant is believed to have been introduced into the port of Mobile, Ala. in the 1930's, most likely in soil used as ballast on South America cargo ships. The fire ants spread from Mobile to other areas across the southern United States. Spread of the fire ants is due not only to natural mating flights, but also to the movement of infested plants, sod, and soil. In 1958, the Federal Fire Ant Quarantine was enacted to try to prevent the spread of fire ants from quarantined areas, but the ant continues to spread at the rate of 5–12 miles per year. Eventually fire ants, unless controlled, are expected to infest almost one-fourth of the United States, including the western seaboard where temperature and moisture are adequate to support establishment of the fire ants. Northward spread of fire ants has been limited by cold weather, but colonies can survive in northern areas by building their nests under roadways, against concrete slabs and in external walls of heated buildings.

The mound or nest of the fire ants has no external openings; underground tunnels radiating from the mound allow ants to come and go in search of food. The number of ants determines the size and growth of each colony. Beginning colonies are generally a few inches across, compared to older colonies which may be in excess of two feet or more in height and diameter. The mound is a series of interlocking tunnels and chambers which may reach more than five feet below the surface. Where the ants are located within the nest is dependent on weather conditions, water level and other factors.

Fire ants are best known for their aggressive behavior. If their nest is disturbed, they defend it by swarming out and over the mound, even running up grass blades and sticks.

Workers of many different sizes make up the fire ants colony. The largest workers are called majors; the medium-sized workers are called medias; and the smallest workers are minors. However, the age of the worker ant, not her size, determines what tasks she will eventually perform.

A mature fire ant colony may contain 100,000 to 500,000 workers and several hundred winged males and females that remain in the nest until weather conditions are favorable for mating flights. After mating in the air, the new queen falls to the ground to begin a new colony, and the male falls to the ground and dies.

Eggs of the fire ant hatch in 7–10 days into grub-like larvae. Larvae are totally dependent on workers for their care. During the following 6–12 days, the larvae will molt four times. After the fourth molt, larvae become pupae and go through metamorphosis. Adults emerge in 9–16 days and begin their tasks in the colony. The oldest ants in the colony are the "foragers." They are responsible for locating food to feed the colony. When a food source is found, the foragers lay a chemical trail back to the mound where they recruit other ants to help transport the food back to the colony.

Fire ant colonies need large amounts of carbohydrates, proteins and fats for their development. They get most of their carbohydrates from eating plant sap and most of their proteins and fats from eating dead animals or those they kill. Fire ants are especially fond of insects. Fire ants may chew and extract liquids from the food source immediately or they may bring the food particle back to the mound where it is given to the largest larvae, the only stage of the fire ant life cycle that can digest solid food.

The fire ant queen controls colony growth and activity by the secretion of chemicals that are licked off of her and passed from worker to worker. Certain workers shield the queen from danger by consuming foods before they are fed to her and by quickly carrying her away if the mound is disturbed. The colony can endure as long as the queen and a few workers survive. This guarding of the queen makes eliminating a fire ant colony very difficult.

Fire ant colonies may include one or more queens. Single queen colonies are very territorial toward other fire ants. Newly mated queens landing in the territory of a single queen colony are attacked and killed. Colony life is different in multiple queen fire ant colonies. Workers in these colonies are less aggressive toward workers from other mounds, therefore, mounds are closer together, making those areas more heavily infested. In multiple queen sites, newly mated queens are often accepted into the colony instead of being killed. Multiple queen colonies may contain a few queens or up to several hundred. Control of these colonies is challenging, because as long as one queen survives, the colony can continue.

The aggressive behavior of fire ants and the ability of each worker to sting repeatedly threatens both man and animal. The sting injects a venom that causes an extreme burning sensation. Pustules, which can become infected if scratched, form. Allergic reactions of people sensitive to the venom include dizziness, swelling, shock and in extreme cases, unconsciousness and death. People exhibiting such symptoms should see a physician. Each year, fire ants do an estimated $300 million in damage in Texas alone. This figure includes pesticide purchases, medical expenses, equipment repair, and livestock losses in rural areas. Fire ants also cause loss of use of public parks and playgrounds, damage to roadway structures, and an indeterminable amount of damage to the environment and local ecosystems. Due to fire ants, Texas has lost a large amount of ground-nesting birds such as quail, doves, and pheasants.

A population of native ants is one of the few factors that can slow the invasion of fire ants. Newly mated fire ant queens, before burrowing into the ground, are susceptible to being killed by native ants. Therefore, it is important to consider the preservation of native ant species when applying fire ant control measures. Eradication of imported fire ants is difficult using present day pesticides because of 1) the large area of infestation, 2) the relatively small area that can be treated with pesticides, 3) short residual activity of current pesticides, and 4) the rapid recolonizing rate of treated areas. Introducing pheromones or disease organisms into the fire ant nest would be an efficient way to control the fire ants, but until the present invention there was no effective way to get the pheromones or disease organisms deep into the nest where the queen and developing larvae reside.

Winged male and female black carpenter ants, called swarmers, emerge from mature colonies usually from March to July. After mating, males die and newly fertilized females (mated for life), now called queens, establish a new colony in a small cavity in moist wood such as a tree stump, fire wood stored near a home, or a wooden porch moistened by rain. The queen lays 15 to 20 eggs in 15 days and feeds the larvae that hatch from the eggs with a regurgitated fluid. The queen does not take food, but uses her stored fat reserves and her wing muscles for her nourishment. The carpenter ants egg stage takes about 24 days, the larval stage 21 days, and the pupal stage 21 days for a total of about 66 days from egg to adult at a temperature of 70 to 90 degrees F. Cool weather may lengthen this period up to 10 months. The few workers emerging from the first brood assume duties of the colony, collecting food, excavating galleries to enlarge the nest and tending the eggs, larvae and pupae of the second generation. Workers regurgitate food for nourishment of the developing larvae and the queen. The queen's duties now are laying eggs and controlling activities in the nest by secreting chemicals that are sensed by the colony members.

It takes about three years for a carpenter ant colony to mature and produce swarmers. A mature colony, after three to six years, may have about 2,000 to 4,000 individuals. Workers have strong jaws and readily bite when contacted.

Carpenter ant nests are usually established in soft, moist (not wet), decayed wood or occasionally in an existing wood cavity or void area in a structure that is perfectly dry. Workers cut galleries in the wood, expanding the nest size for the enlarging colony. Galleries are irregular, usually excavated with the wood grain (sometimes across the grain) into softer portions of the wood. The walls of the nest are smooth and clean (sandpapered appearance) with shredded sawdust-like wood fragments, like chewed up toothpicks (frass), carried from the nest and deposited outside. These piles of wood fragments, often found beneath special openings (windows) or nest openings, may contain indigestible food items such as portions of insects and empty seed coats.

Carpenter ants do not eat wood, but excavate wood galleries in which to rear their young ants. The food diet is of great variety (omnivorous) consisting of both plant and animal materials such as plant juices, fresh fruits, insects (living or dead), meats, syrup, honey, jelly, sugar, grease, fat and "honey dew" (aphid excrement), for example. They feed readily on termites and usually never coexist with them in a home. Workers are known to forage for food as far as 100 yards from their nest.

Carpenter ants may establish nests in a number of different locations. It is important to realize that these locations can be either inside the walls of a home or outside the home in a tree stump. Carpenter ants actually construct two different kinds of nests: parent colonies which, when mature, contain an egg-laying queen, brood and 2,000 or more worker ants, and satellite colonies which may have large numbers of worker ants, but no queen, eggs or young larvae. The carpenter ants found inside a person's home may have originated from the parent colony or from one or more satellite nests.

Control of carpenter ants necessitates locating the site of the nest and treating it with pesticide or otherwise destroying it. Locating the exact position of the nest is often difficult because the point of entry of a single carpenter ant may be 10 feet or more from the nest. If carpenter ants are seen entering a hole in the wall of a home, they may travel many feet behind the wall before reaching the nest. Therefore, treatment of the entry hole or the immediate vicinity around the entry hole may not reach the nest where the queen resides. The difficulty in controlling carpenter ants is reflected in a survey of pest control operators (PCO) that provide carpenter ant service. The survey revealed that 50% of the carpenter ant jobs performed required return visits and additional treatment.

Another method of controlling carpenter ants involves the use of baits. A favorite food material of carpenter ants, such as certain insect larvae and pupae, are ground and mixed with a slow-acting toxicant and then formulated into small granules that the carpenter ant can pick up. A PCO spreads the small bait granules around the vicinity of the carpenter ant nest where carpenter ants have been seen foraging. The carpenter ants pick up and bring the granules into the nest where the granules containing the toxicant are fed to the larvae. The worker ants may also crush the granules and swallow any liquid that may ooze from the granules. The slow-acting toxicant is then spread through the colony by trophallaxis and the colony may eventually be eliminated. However, the use of baits requires weeks to months to take effect and may require repeat applications. Also, the effectiveness of baits is reduced when there are competing food sources for the carpenter ants. In addition to other pests, such as ants, roaches, bees, hornets, spiders, millipedes, and other arthropods and bats, groundhogs, raccoons and other vertebrates, rats and mice are particularly troublesome. Rats and mice are both rodents. The term "rodent" means "to gnaw" which is an apt description of rats and mice which have the habit of gnawing on objects without the intention of using the object for food. About 2% of the day of Norway rats is spent on gnawing. Rats and mice are also known as "commensal rodents" which literally means "sharing the table". This is also a very appropriate description of rats and mice in that wherever humans have established their homes and communities, rats and mice soon invade and take advantage of the food and shelter stored in the homes and communities of their human benefactors.

U.S. Pat. No. 4,874,611 discloses the use of a microencapsulated ant bait wherein a core is said to contain an attractant such as soybean extract mixed with an insecticide. An outer shell is formed over the core. The shell is said to have adequate strength and water resistance while permitting penetration by insects.

Rats, such as the Norway rat (Rattus norvegicus) and mice such as the house mouse (Mus musculus) spread diseases such as viral, bacterial, fungal, protozoan and worm diseases, to humans and other animals, including animals that provide meat, milk, fiber, and other commodities. Norway rats and house mice also cause tremendous amounts of damage to growing food and stored food supplies. Not only is the food damaged by the direct eating of the food, but the food becomes unusable due to contamination by rodent droppings, urine, and hair and it becomes unusable due to the packaging becoming punctured and ripped open by the Norway rat or house mouse. Norway rats also kill and eat poultry and eat eggs. Norway rats and house mice eat grain feed intended for livestock. In addition, the gnawing habits of rodents damage furniture and home furnishings, clothing and textiles, buildings and building materials such as electrical wire, plumbing and insulation. Also, the burrowing habits of rodents result in subsidence and damage to roadways, railroad lines, sidewalks and building foundations.

For convenience of disclosure, the remainder of this description will focus on the Norway rat, although many of the traits described apply to other rodents such as the house mouse, for example.

Norway rats have a territory of about 50–650 yards, where the smaller territorial range tends to be in urban locations and the larger territorial range in rural locations. Norway rats are most active during nighttime hours with peaks in activity 1–2 hours after sunset and 1–2 hours before sunrise. Norway rats also exhibit negative geotaxis, which is the tendency to move downwards as opposed to moving upwards. This explains why rats prefer to burrow downward in soil and are frequently found below street level in sewers.

Norway rats are excellent climbers. They can climb up or down any rough, vertical surface, and they can climb up or down the inside or outside of pipes about 1–4 inches in diameter. Norway rats can jump vertically several times their length and can jump horizontally even farther. They can also walk across wires to gain entry from one building to another.

Norway rats, are frequently found nesting in riverbanks, in canals and in and around sewer systems, are capable swimmers and can be considered semi-aquatic. In commercial fish farm operations, Norway rats jump into water to catch fish. Norway rats have also entered homes and buildings through toilets by swimming through the water trap at the base of the toilet.

Norway rats become sexually mature in 8–12 weeks. Sexually-mature, female, Norway rats ovulate every 4–6 days. Sexually mature, male, Norway rats are attracted to the ovulating sexually-mature, female, Norway rat by an odor emitted by the sexually-mature female, Norway rat. Mating takes place and a litter of an average of 6–12 pups is born 20–23 days later. Female Norway rats have 3–7 litters per year. On the average, 44–45 Norway rat pups survive beyond weaning per year per female Norway rat. The life span of Norway rats is about 12–18 months.

Norway rats groom themselves frequently. Up to 20% of the waking time of Norway rats is spent on grooming themselves.

Norway rats have a high sensitivity to light but they have poor visual acuity (do not see objects clearly). Blind Norway rats behave and do as well as sighted Norway rats indicating the minimal reliance of Norway rats on the sense of sight. Although Norway rats have poor eyesight, they nevertheless are able to rapidly and skillfully sense and negotiate through their environment via the senses of touch, taste, hearing, smell and an ability called kinesthetics. More information on these senses and abilities is given below.

Norway rats, being most active at night during darkness, rely heavily on the sense of touch to move, maneuver and orient themselves in their environment. Norway rats prefer to move about while having their whiskers and guard hairs (long, sensitive, tactile hairs interspersed among the hairs of their fur) in contact with objects. This apparently gives the Norway rat a sense of security in knowing that they are not subject to attack from the side on which they are in contact with an object.

Norway rats have a well-developed sense of taste. Not only do they select fresh food over spoiled food, but they can detect minute quantities (0.25 parts per million) of bitter or objectionable substances in food. This highly developed sense of taste is often the cause of bait refusal by Norway rats.

Norway rats have a well-developed sense of hearing and can locate sources of sounds in darkness to within 6 inches. They can detect all the frequencies humans can (the human upper limit is 20 kHz) plus frequencies up to 100 kHz. There is evidence that rats communicate with one another at frequencies above 20 kHz and may use ultrasounds in echo-location like bats. The Norway rat's keen sense of hearing also provides warning to the animal of nearby enemies or danger.

Norway rats have a well-developed sense of smell. The sense of smell of Norway rats attracts them to a food source, allows them to distinguish between individual rats and allows males to find females in heat. Rats leave odor trails which is followed by other rats looking for food or for mating. Rats suddenly stop moving when they detect cat odor.

Norway rats also have a sense known as kinesthetics, which is the ability of the animal to learn and memorize its surroundings after repeated contact and repeated sequences of muscle movements. Because of kinesthetics, Norway rats have well-established runways leading from their burrows to their food supplies.

Norway rats are neophobic, meaning they avoid new objects or food placed in their surroundings. If rats are accustomed to eating a particular food and a better food is offered, they will avoid the better food because of neophobism. Rats in the laboratory have been seen to avoid the same food if it is only placed in an identical but different feeding dish from which they were accustomed to eat. In one experiment rats lost over 10% of their body weight-over two days rather than feed from the identical but different feeding tray. Neophobia is one of the reasons of bait rejection by rats.

There are a number of known control methods for Norway rats. One method involves the use of poison bait. Although there are effective bait products on the market, they have limitations. Some limitations are:

(a) The neophobia of Norway rats has to be overcome. This can be even more difficult if the Norway rats have an adequate supply of a competing food. This can result in many weeks passing before the Norway rats take the poison bait;

(b) The poison baits cannot be liberally spread around where rats are active because of the potential for contact by children, pets and other non-target organisms. The poison baits must be placed in well-defined, specific locations inaccessible to children, pets and other non-target organisms, or in secure, child-resistant pet-proof bait boxes, or directly in the rat burrows;

(c) Baits placed in sewer systems rapidly decompose due to the high moisture and bacterial environment of the sewer and become unpalatable to the rat;

(d) Rats eating the bait may die behind walls or other inaccessible areas where they decompose causing objectionable odors and become a source for infestations of flies, carpet beetles and clothes moths; and (e) Baits absorb odors from their surroundings, including tobacco smoke and gasoline, making the bait unpalatable to the rat.

Another known method of control of Norway rats involves the use of snap traps. However, the use of snap traps is limited in that they must be placed where people (especially children) will not contact them as they can break or sever a finger and they must be placed where pets cannot reach them. Also, the bait used may not be attractive to the rat, the bait has to be reapplied when it dries out becomes moldy, or becomes unpalatable to the rat, and the bait may be eaten or removed by insects, such as ants.

Another known method of controlling Norway rats involves the use of glueboards, which are pieces of cardboard or plastic trays covered with a thick layer of glue (that may or may not be impregnated with an odor attractive to rats). The glueboards are placed in the known runways of rats. The rats run into the glue, get stuck and can then be removed. However, unless the rats have all four paws stuck firmly in the glue, they can drag the glueboard away and eventually work themselves free from the glueboards. Rats covered with dust or body oils will not stick well to the glueboards. Also, glueboards cannot be used in outdoor areas where they may get rained on or covered with blowing leaves and debris, or where they may trap non-pest animals such as birds and chipmunks. Also, glueboards cannot be used in sewers where the humidity and water spray cover the glue surface making it less sticky.

Yet another known method involves the use of tracking powder, which is an odor-free, poisonous powder such as zinc phosphide, that is dusted along the runways or in the wall voids where rats are known to frequent. The rats run through the powder which adheres to the paws and fur of the rat. When the rat grooms itself, it ingests the zinc phosphide powder which then reacts with the moisture and aqueous acid in the digestive system of the rat forming phosgene gas, a poisonous gas that kills the rat. However, zinc phosphide cannot be used where contact by children or non-pest organisms is possible. Also, zinc phosphide and other tracking powders cannot be used in moist environments such as rat burrows and sewers because the moisture will cause caking of the powder which reduces or removes the ability of the powder to adhere to the paws and fur of the rat. Also, moisture in rat burrows, sewers and the environment can result in the decomposition of the active ingredient in the tracking powder before it is contacted by the pest rodent.

It will be appreciated that rodent pests, as exemplified by the Norway rat, represent a serious and difficult problem.

U.S. Pat. No. 5,527,531 discloses a system for delivery of biologics or chemicals to wild animals such as raccoons, dogs or foxes. A waterproof capsule which contains the material desired to be delivered is embedded in synthetic bait which serves as an attractant. A sleeve made of sponge material, for example, may be employed over the capsule and provided with the food attractant.

U.S. Pat. No. 5,974,726 which issued to the inventors of the present application discloses a method of controlling pests and an associated apparatus which employs a micromachine having a battery and remotely actuatable electric switch. A pest attractant is secured to the exterior of the micromachine. Several embodiments showing means for employing the apparatus and the associated apparatus are disclosed.

In spite of the foregoing prior art disclosures, there remains a very real and substantial need for a method and apparatus of effectively controlling ants and other pests, such as wasps and bees, so as to destroy them or interfere with their ability to procreate.

There also remains a very real and substantial need for a method and apparatus of effectively eradicating Norway rats and other pests, such as house mice, especially in humid environments such as sewers and outdoor rat burrows, and in a manner that will have minimal impact on humans and non-target organisms.

SUMMARY OF THE INVENTION

The present invention has met the above-described need by providing a method and associated apparatus for effectively controlling ants and other pests. The method takes advantage of miniaturized or microelectromechanical miniature machines which can be remotely activated.

In a preferred method of the present invention, a micromachine has a remotely actuatable switch and an operatively associated battery. The micromachine is covered, at least in part, with an ant attractant which may be food or bait or combinations of attractants. After a pest, such as an ant, has transported the micromachine, and preferably has transported the same into the nest, a conventional transmitter may be employed to close the switch and thereby establish responsive action to control the pests.

In one embodiment of the invention, a supply of pheromone or fungus or other substance which would control the pests, is provided within a recess in the micromachine and, closing the switch causes an opening to be created so that the substance may be released.

In another embodiment, a radio frequency transmission is emitted by the micromachine so as to provide means for determining the location of the ant or wasp or bees nest which can then be destroyed by professionally trained pest control personnel.

In another embodiment of the invention, the micromachines are provided with means for vibrating or shaking the same to thereby communicate to the ants or other pests the impression that an intruder or foreign object has entered the nest which impression will serve to attract more of the pests or ants to the micromachine before its contents are released.

In additional embodiments of the present invention which are usable for a wide variety of pests but are particularly usable in respect of rodent pests, several additional features which may be combined with features of other embodiments of the invention are provided.

In one embodiment, a battery energized igniter serves to create an explosion which releases pest control material through a frangible closure in the micromachine. The switch may advantageously be closed remotely as in other embodiments, through RF signals. In some instances where it is contemplated that the micromachines will be adhered to the fur or skin of a rodent pest and during the course of grooming, the pest will ingest the micromachine, chemical sensors, such as pH sensors or glucose sensors, for example, may be employed to close the switch.

In another embodiment, an odorous attractant may be released from the micromachine in order to attract the pests to the same.

A further embodiment contemplates the micromachine, in addition to containing pest control materials, containing neutralizing materials which, when admixed with the pest control materials, will neutralize the same.

A further embodiment contemplates the micromachine transmitting signals responsive to closing of the switch so as to facilitate precise location of the micromachine.

Another embodiment provides projecting elements on the exterior of the micromachine so as to enhance the likelihood that a pest will pick up one or more micromachines on its fur, skin or exoskeleton.

The micromachines may be placed on or within a tube, box or other enclosure or article which facilitates ingress and egress of the pests while having micromachines secured to the walls thereof being picked up by the pests as they move through the same.

It is an object of the present invention to provide a method and apparatus for employing single use microelectromechanical machines in facilitating control of undesired pests, such as ants.

It is another object of the present invention to provide such a system wherein an electrical switch may be remotely closed so as to cause a battery, contained within the microelectromechanical machine, to energize other portions thereof to initiate control of the ants.

It is a further object of the present invention to provide in one embodiment a system wherein a material which is either an insecticide or a pheromone which will interfere with procreation of the ants is released responsive to the generation of heat through an electrically energized resistor which is part of the micromachine.

It is another object of the present invention to provide an embodiment wherein the closing of the switch within the micromachine initiates transmission of radio frequency signals from the micromachine so as to permit personnel to locate the ant nest and eliminate the same.

It is yet another object of the present invention to provide such a system wherein efficiency of operation is enhanced by effecting vibration of the micromachine.

It is a further object of the present invention to provide a method and apparatus for employing micromachines in the control of rodent pests by means which are not hazardous to humans and domestic pets.

It is another object of the present invention to provide such a system wherein switches in the micromachines may be closed responsive to chemical sensors which are exposed to the gastrointestinal passage of a rodent pest.

It is another object of the present invention to provide micromachines which distribute pest control material responsive to an explosive reaction within the micromachine.

It is a further object of the present invention to provide micromachines which are structured to release an odor which is attractive to the pest.

It is yet another object of the present invention to provide a micromachine structured to transmit a radio signal so as to facilitate location of the micromachine.

It is yet another object of the present invention to provide such a micromachine which has exterior projections adapted to facilitate pick up of the micromachine by a pest's fur, skin or exoskeleton while the micromachines remain removable as in the animals self-grooming.

These and other objects of the present invention will be fully understood from the foregoing description of the invention on reference to the illustrations appended hereto.

DESCRIPTION OF THE PREFERRED EMBODIMENTS

Figure 1:
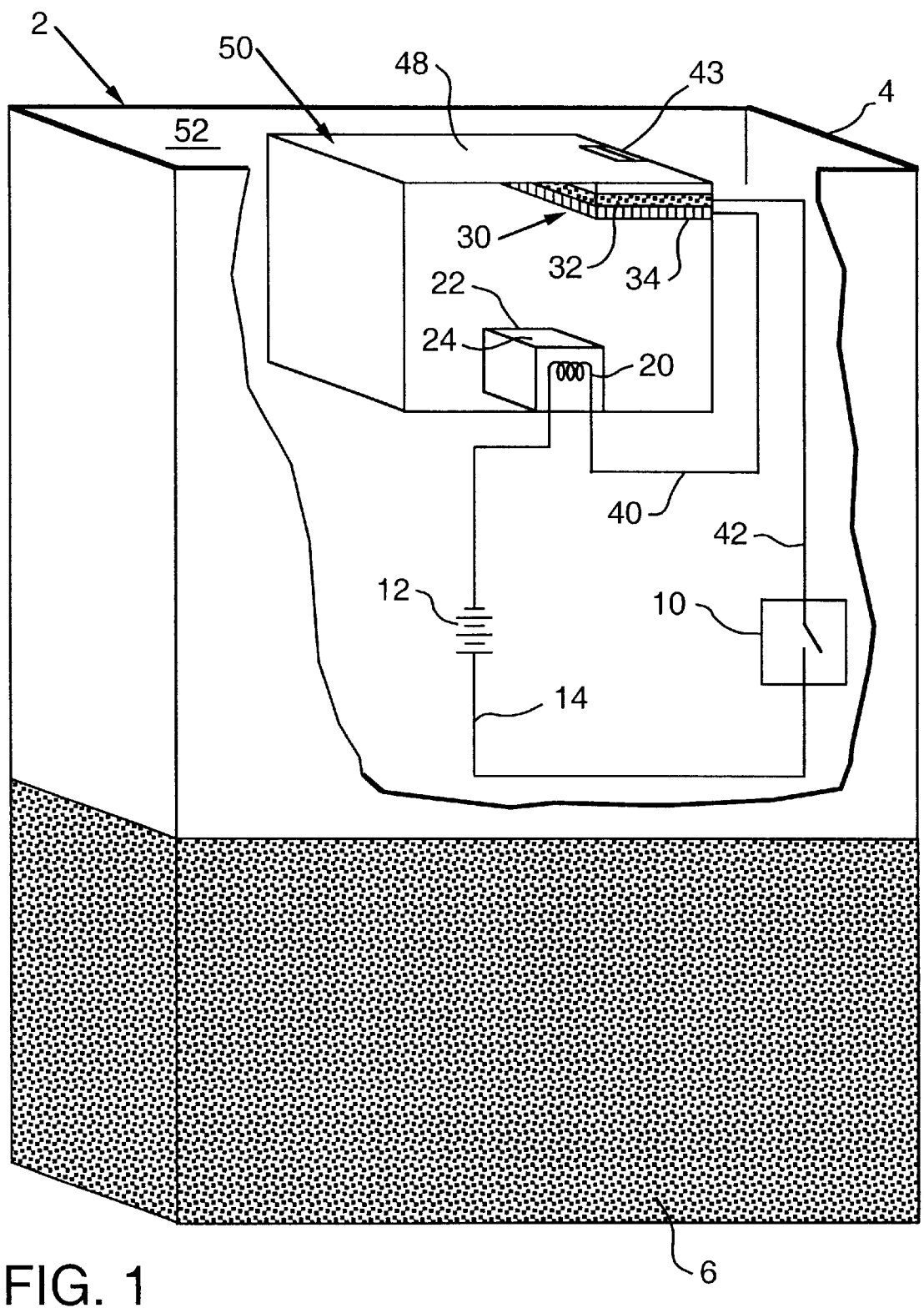
FIG. 1 is a schematic illustration of a form of electromechanical micromachine employed in the methods of the present invention.

The term "micromachine," as employed herein, refers to miniaturized machines which are typically made of metal or a polymeric material and are known to those skilled in the art and may have electrical components as well. See generally, "The Common Man's Micromachine? Researchers Cut The Cost of Tiny Gears and Motors by Using Standard Equipment," Georgia Institute of Technology (1991). The term, as used in the present context, will be used interchangeably with the expression "microelectromechanical miniaturized machines" or "microelectromechanical machines." In general, these machines will have a maximum dimension of about 10 to 1,000 micrometers, but may vary slightly depending on the particular need.

The term "attractant," as employed herein, refers to any substance which a pest will find appealing as a food item such that it will tend to transport it back to the nest and expressly includes foods, baits, attractants and feeding stimulants, as well as combinations thereof. The attractant should not be positioned in such a thickness or be composed of such a material or placed in such position as to interfere with radio frequency communication contemplated by the present invention. An "ant attractant" is an attractant appealing to ants.

While, for purposes of simplicity of discussion, two primary ants, the fire ant and the carpenter ant, will be expressly discussed herein, it will be understood, however, that the invention is not specifically limited to use in controlling these two species of ants, but may be employed to control a wide variety of undesirable ants such as odorous house ants, pharaoh ants, wasps, killer bees and other nesting insects, for example.

As employed herein, the term "pests" shall include, but not be limited to, rodent pests (as defined herein) moles, shrews, opossums, raccoons, skunks, rabbits, snakes, pigeons, sparrows and starlings, ants, wasps, bees, and other arthropods.

As employed herein, the term "rodent pests" means rats, mice including but not limited to house mice, deer mice, white-footed mice, squirrels, nutria, muskrats, gophers, porcupines, prairie dogs and ground hogs.

As employed herein, the term "pest control material" means an agent or mixture of agents intended for preventing, destroying, repelling, or mitigating a pest. The agent may be a synthetic substance, a naturally-occurring substance, or a biological pest control agent. Synthetic pesticide agents include, but are not limited to, organic and inorganic substances, such as fipronil and boric acid, that are prepared in industrial laboratories. Naturally-occurring pesticide agents include, but are not limited to, pheromones (a substance or mixture of substances produced and emitted by members of one species that modify the behavior of others within the same species, an example being the mite sex attractant farnesol), allomones (a substance or mixture of substances produced and emitted by members of one species that modify the behavior of others of a difference species, to the benefit of the emitting species, an example being 4-allyl anisole which is emitted by damaged trees to repel attack by bark beetles), kairomones (a substance or mixture of substances produced and emitted by members of one species that modify the behavior of a different species to the benefit of the receptor species, an example being cat odor which repels mice), and hormones (a substance or mixture of substances produced in part of an organism and translocated to another part of the same organism where it produces a controlling, behavioral, or regulating effect, an example being gibberellic acid which is a plant hormone that regulates plant growth). Biological pest control agents include, but are not limited to, viruses, bacteria, fungi, protozoa, nematodes and arthropods, an example being Nosema Locustae which is a microbe that causes a fatal disease of grasshoppers.

A common strand of the present invention is the concept of the micromachines of the present invention being of such size and shape that an ant or other pest may readily transport the same into its nest or other home and thereby facilitate control over and destruction of the ants or pests. This is accomplished through radio frequency communication between the micromachine and the user of the system.

Referring to FIG. 1, there is shown a micromachine 2 which has a protective housing 4 and an ant attractant 6 which is shown covering only a portion of the exterior surface of the micromachine 2, but preferably would cover at least a major portion thereof in a thickness of about 0.1 to 1.0 millimeter. In the embodiment illustrated in FIGS. 1 and 2, a radio frequency actuated relay switch 10, which is normally in the switch open position, is electrically connected to battery 12 which may be a thin film battery which is readily known to those skilled in the art. Battery 12 is connected to switch 10 by electrically conductive lead 14. An electrical heating element 20 is secured within a chamber 22 which contains a suitable fluid 24 such as n-pentane or n-hexane, for example. A bimetallic element 30 consists of a portion 32 composed of a first metal and a portion 34 composed of a second metal intimately bonded thereto. Conductive lead 40 connects electrical heating element 20 with element 34 and electrical lead 42 connects element 32 with switch 10. When the switch 10 is closed through radio frequency actuation, battery 12 will energize resistance element 20 thereby causing the fluid in chamber 22 to expand as a result of thermal expansion to fracture the chamber 22 and thereby urge the pheromone, hormone, disease-causing microorganism, parasite, insecticide or fungus or other material out of container 50. The electrical leads 40, 42 have imposed currents on bimetallic element 30 thereby causing differential expansion of elements 32, 34 which are composed of different materials and causing the lid 48 to open by rotating about hinge 43, thereby permitting the contents to be discharged. It will be appreciated that in the preferred embodiment the lid 48 will open prior to fracture of container 22.

Figure 2:
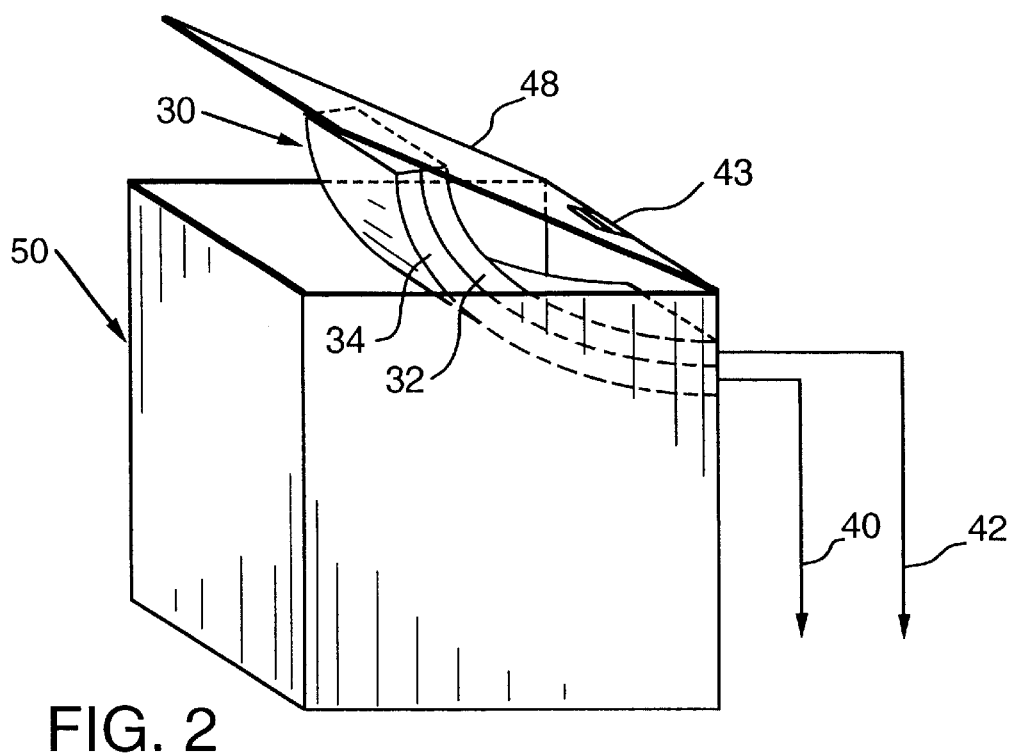
FIG. 2 is a fragmentary illustration showing a modified position of a portion of the structure of FIG. 1.

As shown in greater detail in FIG. 2, the bimetallic beam 30, when subjected to the appropriate level of heating, will go from its generally planar configuration shown in FIG. 1 to the curved configuration shown in FIG. 2 thereby causing the lid 48 of the container 50 to rotate upwardly about hinge member 43. The upper portion 52 (FIG. 1) of the micromachine 2 is open to permit discharge of the pheromone, hormone, disease-causing organism, parasite, insecticide or fungus. The contents of the small container 50 are released through the open end 52 of housing 4 and enter the nest interior. If the material is a pheromone, the queen will have lost full control over the normal activities of the nest thereby producing a breakdown in the social structure of the nest and creating an inability of the colony members to function normally.

The container 50 will, depending upon the manner in which the ants are to be controlled, contain a pheromone which is designed to interfere with normal sexual activity in propagating the species and thereby bring about eventual extinguishment of the species in the nest, or may be a disease-causing element, such as a fungus or other microorganism. Examples of other materials which could be used are an alarm pheromone that causes the ants to act as if the nest is being attacked resulting in the ants attacking one another, or an insecticide, or a parasitic organism.

Figure 3:
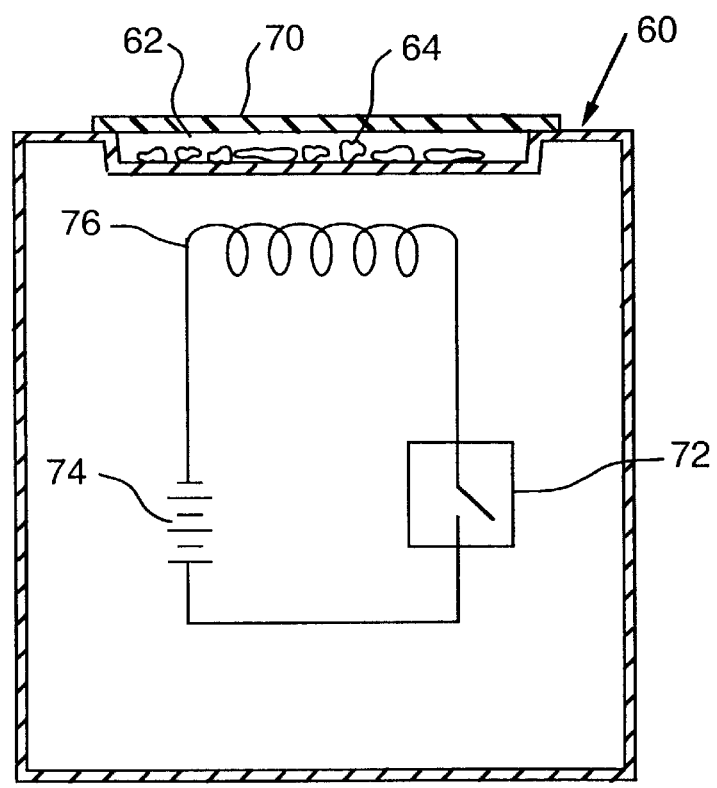
FIG. 3 is a fragmentary illustration of an alternate embodiment of a portion of a system employable in the control of pests in accordance with the present invention.

Referring to FIG. 3, an alternate embodiment of the invention will be considered wherein the micromachine 60 has an outwardly open recess 62 within which a material, such as a pheromone or fungus, for example 64, is provided. A thermally destroyable film 70, such as a resinous plastic film, is provided in sealed overlying relationship with respect to recess 62. The switch 72, when closed, causes the battery 74 to energize electrical resistance coil 76 thereby creating sufficient heat to destroy the integrity of film 70 and permit the material 64 to be released within the nest.

It will be appreciated that any suitable RF generator having an output at the appropriate frequency can be employed to close or open the radio frequency activated relay switch 10, 72. After completion of release of the material, the charge from the particular micromachine will have been used and there being no means for reclosing the embodiment of FIG. 3. As the micromachines are intended for a single use, there is no need to effect opening of the switch.

The embodiment of FIGS. 1 and 3 is particularly advantageous in respect of controlling fire ants.

Figure 4:
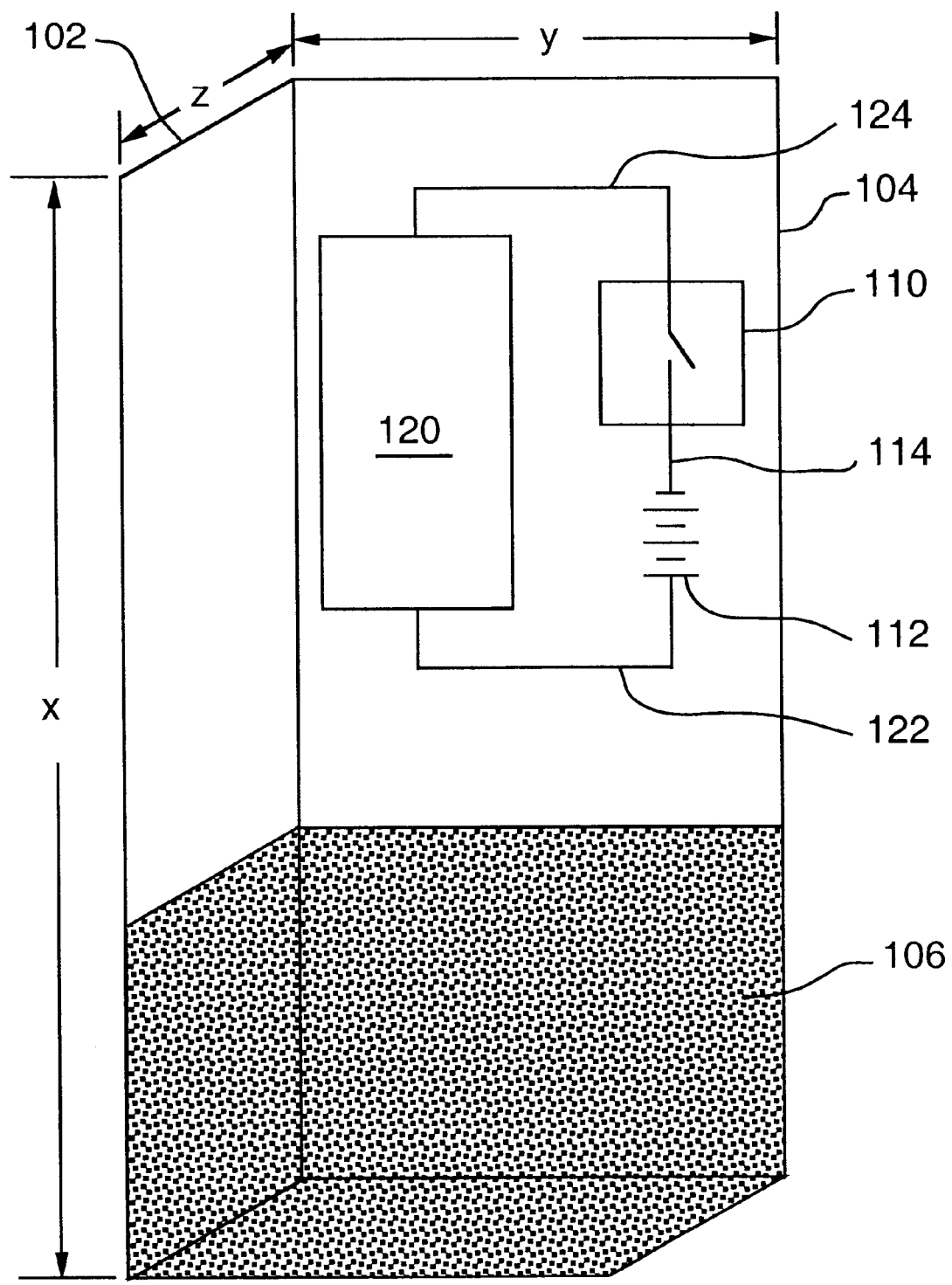
FIG. 4 illustrates a microelectromechanical machine of the present invention operable to control ants in a different manner from the embodiments of FIGS. 1 through 3.

In the embodiment shown in FIG. 4, a micromachine 102 has an ant attractant 106 coated on the housing 104 preferably over at least a major portion thereof. The micromachine in this view is shown as having a height X of about 2 to 4 mm and a width Y of about 1 to 2 mm with a depth Z of about 1 to 2 mm. The measurements are taken of the housing exclusive of the coating of ant attractant material 106. In this embodiment, the radio frequency activated switch 110 is operatively associated with a battery 112 by electrical lead 114. A radio frequency transmitter 120 is adapted to emit radio frequency signals when the switch 110 is in a closed position. The transmitter is electrically connected to the battery 112 through lead 122 and to the switch 110 through lead 124. After the ant has transported the attractant covered micromachine to the nest, employing a conventional radio frequency transmitter, at the desired frequency, will effect closing of the switch thereby causing radio frequency waves to be transmitted. Any suitable radio frequency detector may be employed to locate the nest which contains the micromachine 102.

The radio frequency emitted by the embodiment of FIG. 4 can be found using a field strength meter, a radio frequency sniffer or other electronic direction finder/triangulation techniques. This facilitates uncovering and elimination of the nest.

The embodiment of FIG. 4 is particularly well suited to use with control over carpenter ants. The outer portion or housings may be made of a polymeric material which does not interfere with desired signal transmission.

It is known that ants and other pests tend to approach an intruder into their nest in order to attack and destroy the intruder. In a further embodiment of the present invention, which will be considered in connection with FIGS. 5 and 6, the micromachine may be provided with means to vibrate or shake the micromachine thereby causing the ants in the nest to conclude that an invader or foreign object has entered the nest and attracting the ants or pests thereto. As a result, when the micromachine releases its pest control substance, the pest control substance will impact a greater number of ants as a larger number will be attracted to the vibrating micromachine before the contents are released. While a preferred form of vibration inducing system will be disclosed in the context of the embodiment of FIG. 3, it will be appreciated that the vibration inducing means is usable with all embodiments of the present invention.

Figure 5:
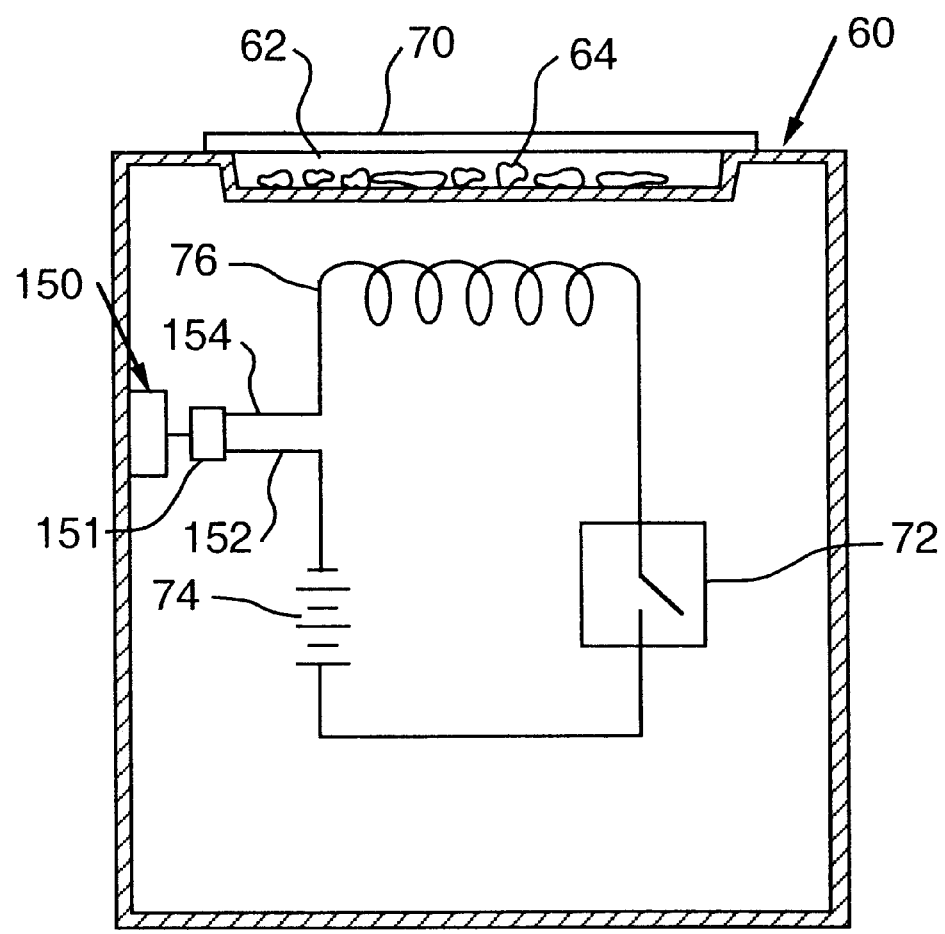
FIG. 5 is a schematic illustration of the embodiment of FIG. 3 showing a form of means for effecting vibration of the micromachine.

With reference to FIG. 5, a vibration inducing means 150 is secured to a wall of micromachine 60 within said micromachine and is operated by controller 151 which is electrically energized by battery 74 through leads 152, 154.

While the vibration can be initiated on a continuous basis, in order to conserve energy of battery 74, it is preferred that it operate intermittently and may have a period of vibration on the order of about 1–2 seconds. The bursts of vibration may be provided every 5–7 seconds over a time period of about 15–20 seconds.

The vibration is not only helpful in connection with the embodiments which release a pest control substance, but also is effective with the embodiment of FIG. 4 which releases a radio-frequency signal to assist pest control personnel in locating the nest. It is effective with this embodiment because when this embodiment is spread around the vicinity of the ant nest to be located, the periodic vibration of the embodiment will aid in attracting foraging ants to the vibrating embodiment. Therefore, the vibrating micromachine embodiment will be more likely located by the foraging ants resulting in more of the vibrating micromachines being brought into the nest. The greater number of vibrating micromachines in the nest will result in production and transmission of a stronger combined signal being released from the nest which will make location of the nest easier and more precise. For this use, it is preferred that there be vibration periods of about 1–2 seconds, initiated about every 10–15 minutes over a time period of about every 10–12 hours.

Figure 6A:
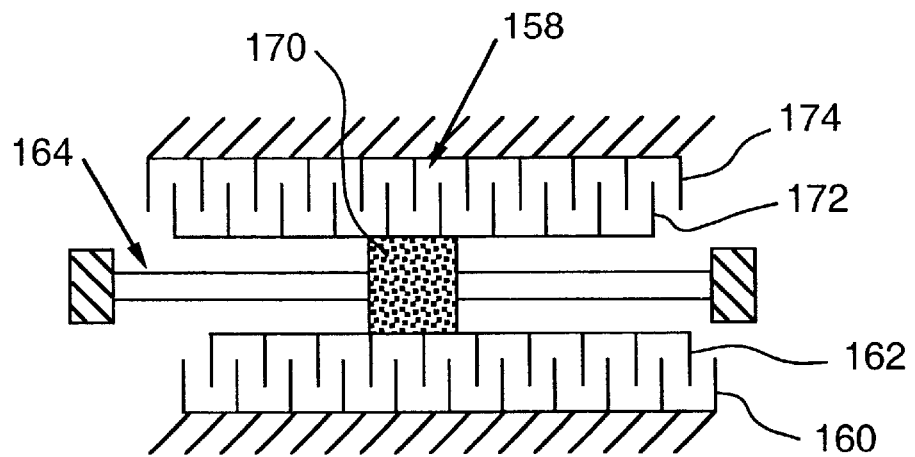
FIG. 6(a) is a schematic illustration of a comb drive employable in effecting vibration of the micromachine.
Figure 6B:
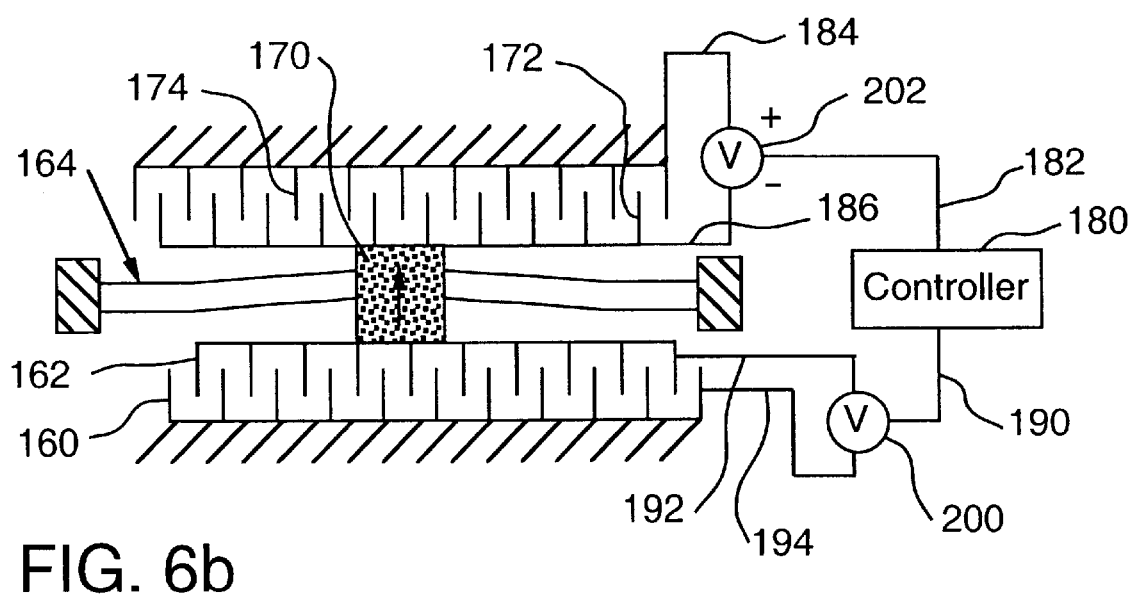
FIG. 6(b) is a schematic illustration of the comb drive showing associated apparatus for operating the same and the comb in a different relative position from that of FIG. 6(a).

Referring to FIGS. 6(a) and 6(b), there is shown a comb drive 158 which may advantageously be employed as the vibrating mechanism 150 shown in FIG. 5. These known comb drives 158 have a central support 164 which may be deformable and a connector member 170 connecting to oppositely faced combs 162, 172 which have interdigitated fingers cooperating with comb segments 160, 174.

As shown in FIG. 6(b), a controller 180 operating respectively through leads 182, 190 cooperates with voltage sources 202, 200 to periodically apply voltages across the pair of combs 172, 174 and 160, 162 to thereby effect movement and establish vibrations. In the form shown, voltage source 202 has caused comb 172 to move upwardly into comb 174 and comb 162 to move outwardly from its interengagement with comb 160. In this manner, cyclic controlling through controller 180 will result in the desired periodic vibration of the micromachine to accomplish the objectives of the present invention. Additional details regarding such micromachines which are known to those skilled in the art are disclosed in Introduction to MicroEngineering by Danny Banks 1 The Sands, Milton Under Wychwood, Oxon, UK (1999). See particularly pps. 38–42.

It will be appreciated that in lieu of the use of the comb drive, other types of microactuators which are known to those skilled in the art may be employed to effect the desired vibration of the micromachines. Among such microactuators are wobble motors, electrostatic, magnetic, piezoelectric, hydraulic and thermal microactuators. Within this overall grouping, the presently preferred microactuators are the comb drives, piezoelectric microactuators and hydraulic microactuator.

As ants are able to drag or carry weights approximately 10 to 50 times their weight, the micromachines of the present invention may be made sufficiently small and light as to permit transport to the nests.

In using the method of the present invention, the micromachines will be placed in the foraging area of the fire ant nests and after the one or more micromachines have been brought to the nest, the radio frequency signal will be transmitted from outside thereby causing the switch to close and thereby releasing the pheromone, hormone, disease-causing microorganism, fungus or fungal spores.

While reference has been made herein to certain components being disposed in the micromachine and this will generally be the preferred approach unless in a specific instance the location is specifically limited to such a location, the term shall be deemed to embrace items secured to the exterior thereof.

While for simplicity of disclosure herein, specific reference has been made to ants, it will be appreciated that the invention may also be employed in the control of other types of pests such as wasps and killer bees, for example.

It will be appreciated from the foregoing that the present invention takes advantage of modern micromachine technology to induce ants and other pests to carry suitably equipped micromachines back into the nest after which externally applied radio frequency signals are employed to close an electrical switch and produce action which effects control over the ants or pests.

In other embodiments of the invention, micromachines particularly suitable for rodent pests, but also suitable for other pests will be considered.

The micromachines will be placed in areas known to be frequented by pests. As the pest walks or runs through a layer or deposit of the micromachines (such layer or deposit being placed in the area frequented by the pest or being placed within a tube, box or article or other enclosure with openings providing ingress and egress for the pest), the micromachines will adhere to the outer skin, exoskeleton (in the case of insects and other arthropods) or, in the case of rats and mice, to the fur or outer skin of the rats and mice. During subsequent grooming, the micromachines will then be ingested by the pests. Upon entering the digestive system of the pest, the micromachine will release its pest control material by responding to a chemical sensor that senses the chemical environment or pH condition or glucose level in the pest's digestive system or by responding to a radio signal transmitted by someone monitoring the pest problem and involved in the pest control program using the micromachines or responsive to a timer disposed within the micromachine. The micromachine can also include a radio transmitter which emits RF signals to help locate the pest after it has died so it can be removed before it decomposes releasing foul odors and become a breeding source for flies, carpet beetles, clothes moths and other decomposers. The micromachine can also include a means to neutralize the pesticidal agent contained in the micromachine. The present invention has met the above-described need by providing a method and associated apparatus for effectively controlling rodent pests and other pests. The method takes advantage of microelectromechanical machines, also known as micromachines or MEMS, which can sense and respond to their surroundings and can be remotely activated. The micromachine will contain a pest control material and protect the pest control material from moisture and decomposition. The inside of a secure, child-resistant, pet-proof plastic or metal tube can be loosely coated with the micromachines and the tube can then be placed in a sewer pipe or the tube can be firmly attached to the ground near the areas known to be frequented by pests such as pest rodents. Micromachines can also be applied to boxes, a plurality of enclosures and other articles which are likely to be contacted by pests.

In a preferred method of the present invention, a micromachine has a switch actuatable by a chemical sensor and an operatively associated battery. After a pest, such as a Norway rat or a house mouse, for example, has contacted the micromachine and gotten the micromachine adhered to its fur or skin and has then groomed itself and ingested the micromachine, the chemical sensor that is part of the micromachine will sense the chemical environment in the rodent's digestive system resulting in closing of the switch thereby establishing responsive action to control the pest.

It will be appreciated that the micromachines discussed in connection with the embodiments disclosed in FIGS. 7 through 12 may assume the general structure, shape and size as those previously illustrated and disclosed in connection with FIGS. 1 through 6. Also, individual features of the micromachines of FIGS. 7 through 12 may be employed in combination with the micromachine shown and disclosed in connection with FIGS. 1 through 6, as well as with other features of FIGS. 7 through 12.

Figure 7:
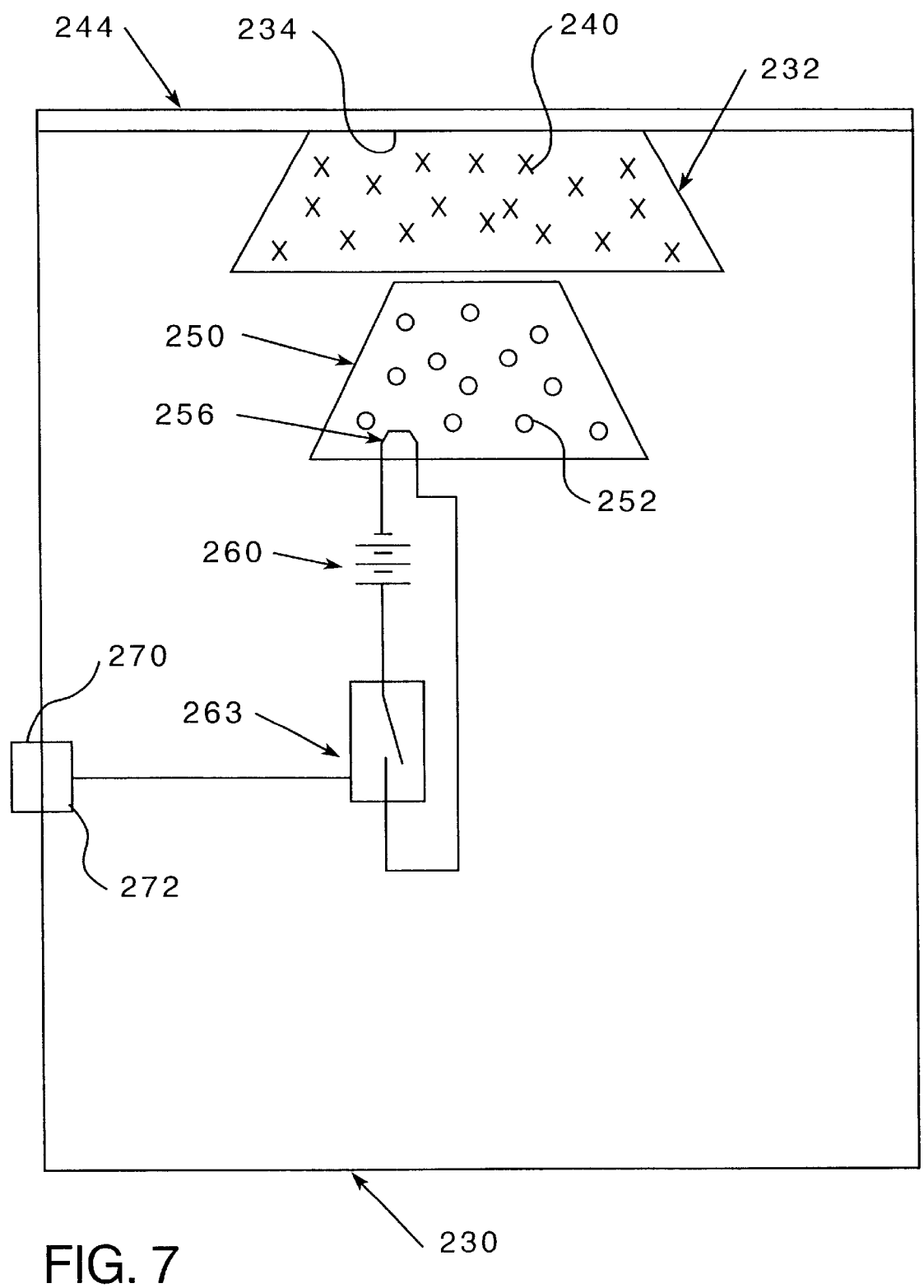
FIG. 7 is a schematic illustration of a form of micromachine of the present invention which employs an explosive material to release pest control materials.

Referring now to FIG. 7, there is shown a micromachine 230 which has an outwardly open recess 232 with an opening 234 disposed adjacent to an outer wall of the micromachine 230. The recess 232 contains a quantity of a pest control material 240. A suitable closure 244 which may take the form of a frangible synthetic resinous film covers the opening 234 such that destruction or removal of the closure 244 will permit the pest control material 240 to emerge from the micromachine 230 and be distributed therearound. Underlying and positioned closely adjacent to recess 232, and if desired, secured thereto by any suitable means such as adhesive means or self-bonding, is a container 250 which has a supply of an explosive material 252. An igniter 256 is disposed closely adjacent to or extending within the container 250. The igniter 256 is operatively associated with battery 260 such that when switch 263 is closed, the battery 260 will serve to heat the igniter 256 thereby causing the explosive material 252 to be detonated and thereby fracture closure 254 and spread the pest control material throughout the area adjacent to micromachine 230. The switch may be activated remotely, such as disclosed hereinbefore in respect of other embodiments or may be activated responsive to a chemical sensor which might, for example, sense pH or a glucose sensor.

The sensor 270 is preferably etched onto or secured to the exterior of the micromachine 230 so as to monitor the external environment immediately adjacent to the micromachine 230 or to be in communication therewith. Such sensors have been known to those skilled in the art. The output of the sensor 270 may pass through microprocessor 272, which, responsive to a predetermined reading, will initiate closing of the switch.

Figure 8:
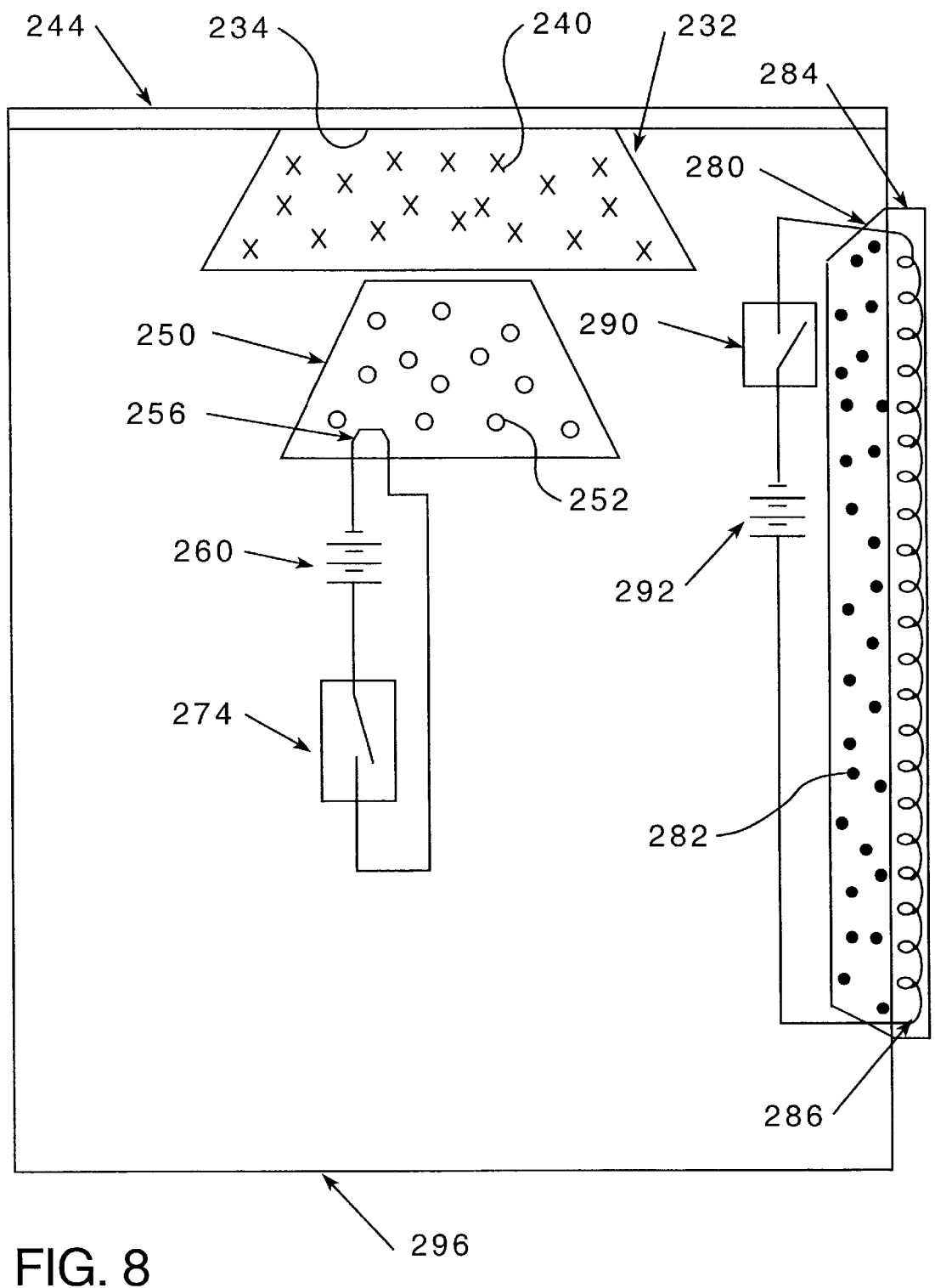
FIG. 8 is a schematic illustration of a form of micromachine structured to release a pest attracting odor.

Referring to FIG. 8, there is shown a micromachine similar to that of FIG. 7, but with certain modified features. For example, the switch 274 can be a remotely actuatable switch as discussed in connection with other embodiments of the invention. In addition, the embodiment of FIG. 8 contains a recess or container 280 within which is disposed a material 282 which, when released, would provide an odor which would be attractive to the pest. A film 284 which may be destroyed thermally through energizing electrical resistance wire 286 is provided such that destruction of the film 284 will facilitate release of the odor. The closing of remotely actuatable switch 290 causes battery 292 to provide the energy for heating the electrical resistance coil 286 thereby destroying the thermally destroyable film 284 so that the odorous or odor generating material 282 may be exposed to the exterior environment around the micromachine 296.

Figure 9:
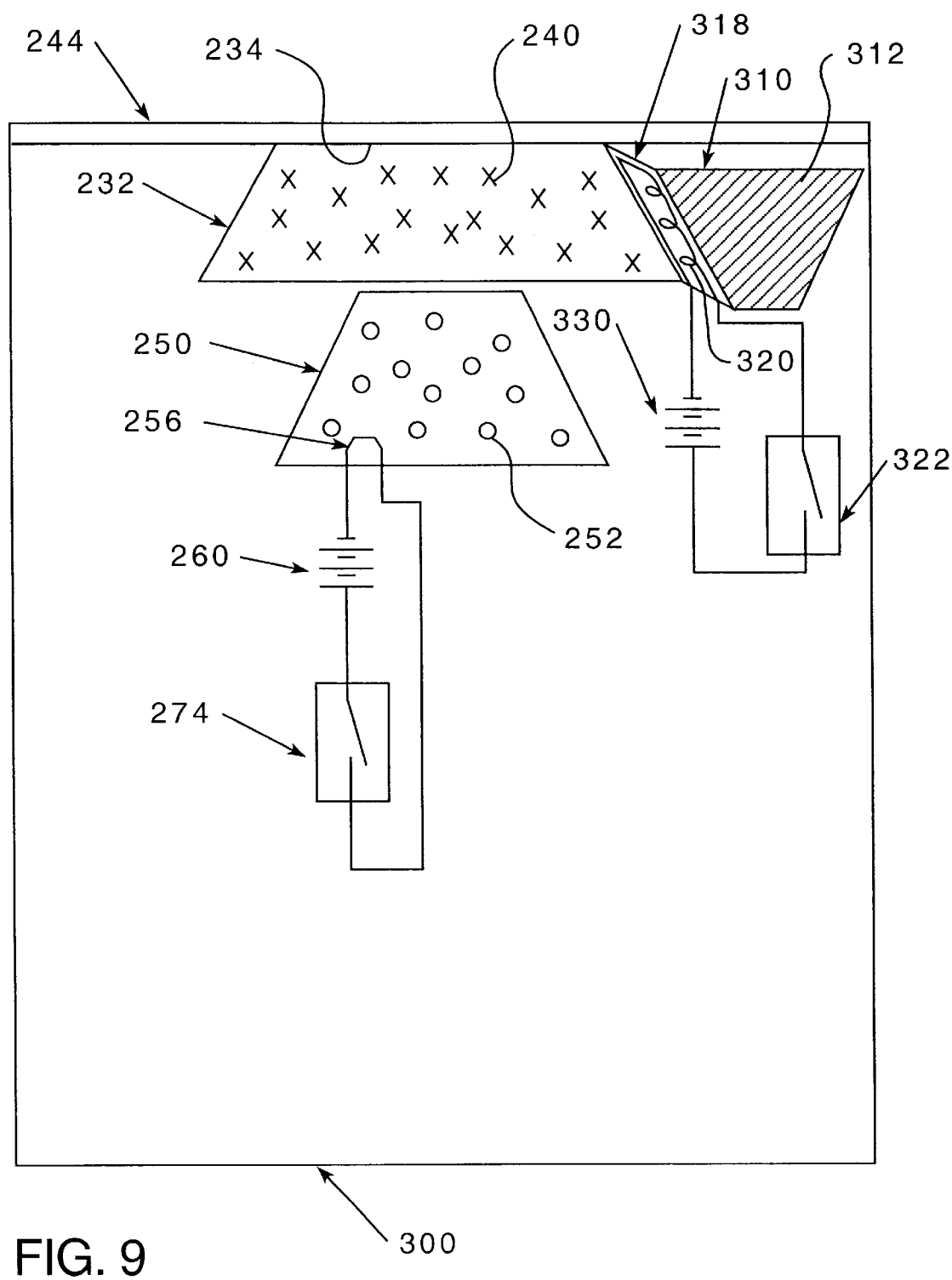
FIG. 9 is a schematic illustration of a form of micromachine structured to release a material which can neutralize the pest control material.

FIG. 9 shows a micromachine 300 which has like numbered features similar to that of FIG. 8. An additional feature of this embodiment is a container or recess 310 which has a supply of a neutralizing material 312 which can neutralize the pest control material 240. This neutralizing material 312 is adapted to come in contact with the pest control material 240 when a thermally destroyable film 318 is destroyed by heat generated by electrical coil 320 once remotely actuatable switch 322 is closed such that battery 330 may energize the coil 320. This embodiment may be employed advantageously in situations wherein it is desired to neutralize the pest control material 240 so that the pest control operation may be stopped or interrupted. The switch 322, as with certain other switches of the present embodiment, may be actuated by radio signals. Alternately, a chemical sensor may be employed to activate switch 322.

Figure 10:
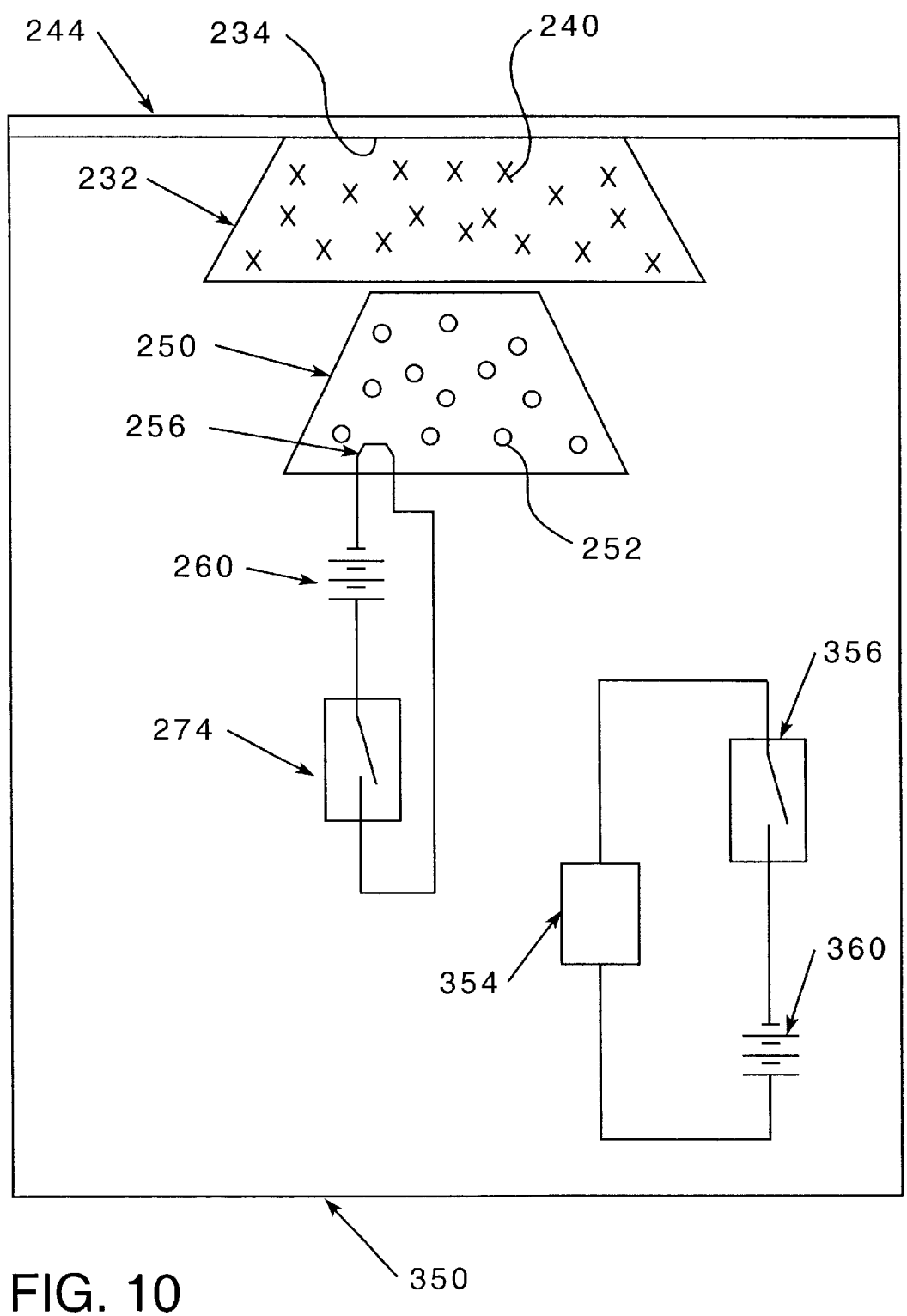
FIG. 10 is a schematic illustration of a micromachine containing a radio frequency transmitter.

Referring to FIG. 10 wherein like numbers refer to like features of FIGS. 7 through 9, a micromachine 350 has an RF transmitter 354 which, responsive to closing of switch 356 with energy provided by battery 360, will transmit a signal thereby enabling one to determine the location of the device. The switch may be remotely actuatable or if desired, be of a type of pH sensor or glucose sensor, such as described in connection with FIG. 7. Such a transmission and location of the micromachine 350 can be helpful in determining the location of the pest.

Figure 11:
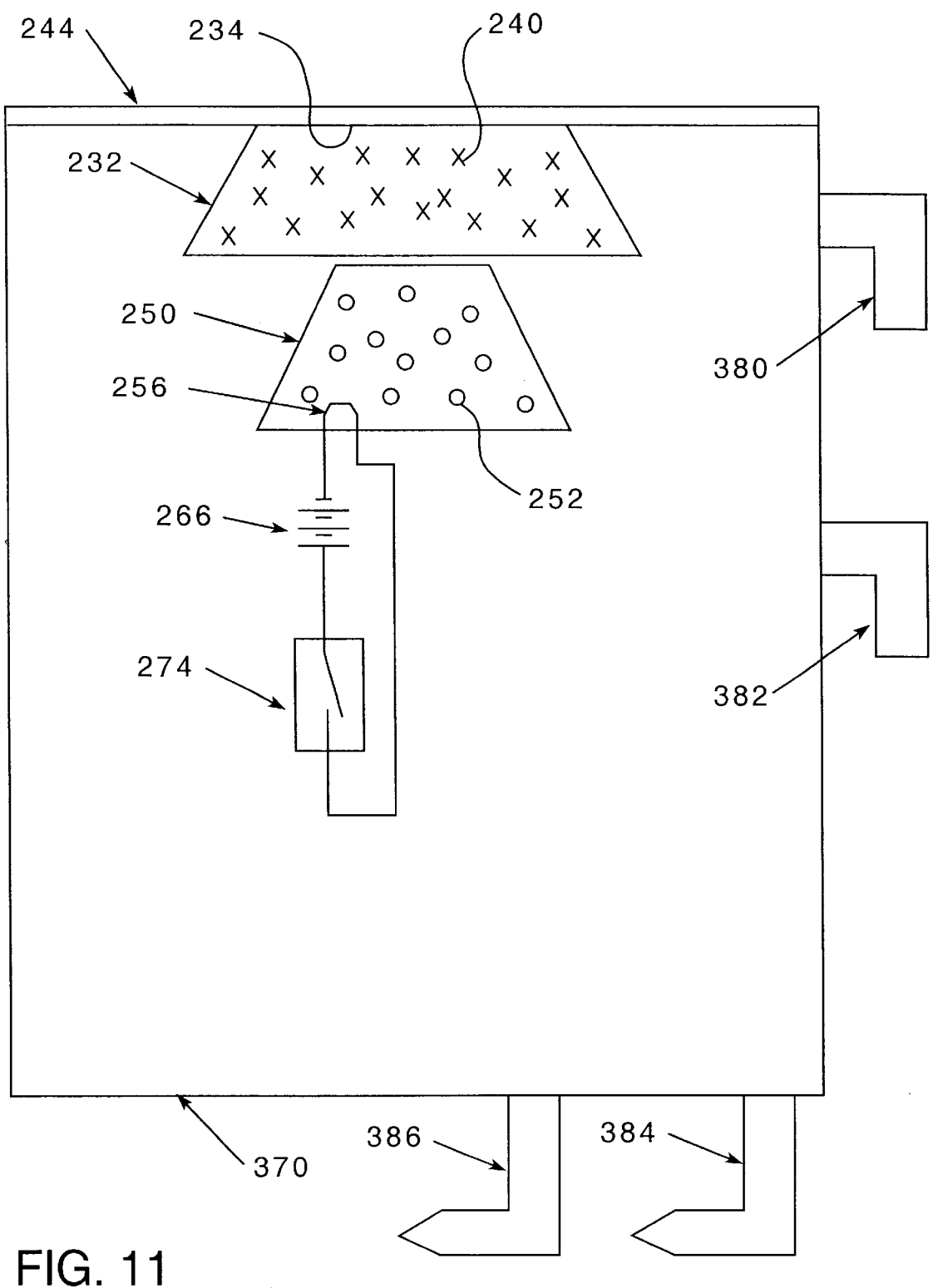
FIG. 11 is a schematic illustration of a micromachine having external projections for engaging a pest.

Referring to FIG. 11, wherein in micromachine 370 like reference numbers refer to previously identified like elements, the micromachine 370 may have a plurality of projections, such as 380, 382, 384, 386, for example, which may have various dimensions and configurations so as to enhance the likelihood that it will adhere to the fur, skin or exoskeleton of the pest. It is also desired that for rodent pests, the micromachine 370 will be removed from the fur or skin by the pest during pest grooming and thereby ingested to permit chemical sensors, such as pH sensors or glucose sensors to be activated within the gastrointestinal passageway of the pest.

Figure 12:
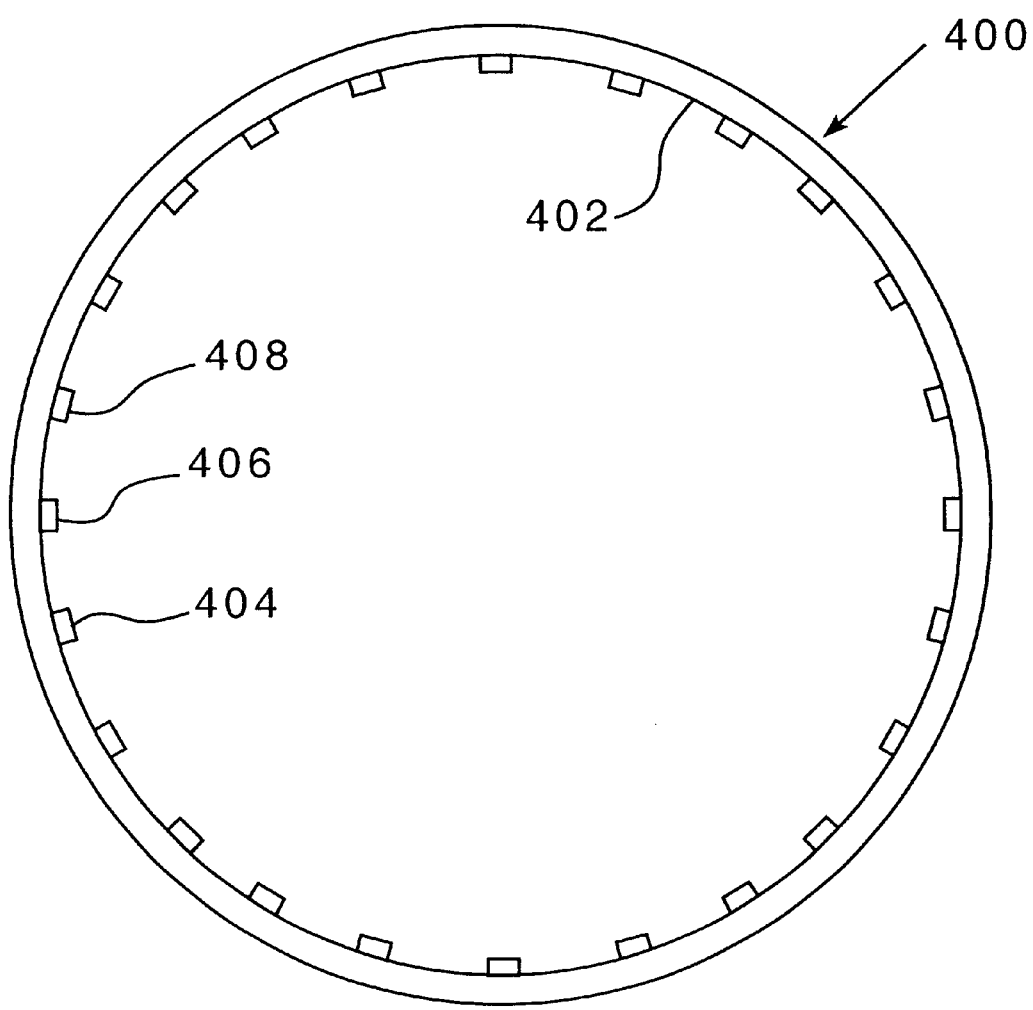
FIG. 12 is an end view of a pipe having a plurality of micromachines secured to the interior thereof.

Referring to FIG. 12, there is shown an elongated tube 400 which may be made of any suitable material and preferably has an interior diameter of sufficient size to permit a rodent pest to pass therethrough while having portions of its skin or fur at least periodically contact the interior surface 402 of the tube 400 such that some of the plurality of micromachines such as 404, 406, 408 are picked up by the rodent pest as it moves therethrough. Other articles, boxes or enclosures which contact with the rodent pest likely may be employed.

It will be appreciated therefore that the invention has provided an effective means for employing micromachine technology in exterminating, destroying, disabling or interfering with procreation, and or locating pests and, in respect of certain embodiments, rodent pests, in a manner which is safe in terms of undesired exposure of prior art systems to humans and particularly children, as well as domestic pets. Also, the invention has provided an effective means for employing micromachine technology in exterminating, destroying, disabling or interfering with procreation in environments and locations where existing pest control means are ineffective, such as in sewers, rodent burrows and other humid, microbially active environments.

Whereas particular embodiments of the invention have been described above for purposes of illustration, it will be evident to those skilled in the art that numerous variations of the details may be made without departing from the invention as defined in the appended claims.

What is claimed is:

1. A method for controlling pests comprising providing a micromachine having a pest control material, an explosive charge, a detonator, a switch, and a battery, remotely closing said switch, and effecting by said switch closing energizing a battery to initiate explosive release of said pest control material to control said pests.

2. The method of claim 1, including employing said method in controlling rodent pests.

3. The method of claim 2, including closing said switch by remote activation.

4. The method of claim 3, including operating said switch by RF transmitted signals.

5. The method of claim 1, including employing a chemical sensor to activate said switch.

6. The method of claim 2, including activating said switch when said micromachine is in the gastrointestinal tract of said rodent pest.

7. The method of claim 6, including employing a chemical sensor to activate said switch.

8. The method of claim 7, including selecting said chemical sensor from the group consisting of pH sensors and glucose sensors.

9. The method of claim 3, including providing said pest control material in a recess in said micromachine, and positioning said explosive charge generally adjacent to said pest control material recess.

10. The method of claim 9, including providing a frangible closure over said pest control material containing recess, and destroying the integrity of said closure by said explosion.

11. The method of claim 3, including providing an attractant odorous material within said micromachine, and releasing said odor by employing means independent of said switch and battery and explosive charge.

12. The method of claim 11, including providing an electrical resistance coil, a second switch and a battery, and energizing said electrical coil upon the closing of said second switch to generate heat, providing a closure over said odor attractant material, and destroying said closure by means of heat generated by said electrical coil.

13. The method of claim 12, including effecting said release of said attractant odor before said release of said pest control material.

14. The method of claim 13, including employing radio frequency energy to activate each said switch, and employing a different frequency as to each switch so that the sequence of switch closing can be controlled.

15. The method of claim 1, including providing an RF transmitter within said micromachine and having a battery and switch operatively associated therewith.

16. The method of claim 15, including closing said switch to cause said transmitter to emit RF signals to facilitate locating the micromachine.

17. The method of claim 2, including providing physical projections on the exterior of said micromachine to facilitate pickup of the micromachine by said pest.

18. The method of claim 17, including employing projections which are releasable from said pest so as to enhance the likelihood that a pest engaging in self-grooming will ingest the micromachine.

19. The method of claim 1, including providing a plurality of said micromachines releaseably secured to an article.

20. The method of claim 19, including employing as said article a generally tubular member dimensioned such that a rodent pest passing therethrough will be likely to contact the interior walls thereof, and removably securing said micromachines to said interior walls.

21. The method of claim 19, including employing a box as said article.

22. The method of claim 20, including securing a plurality of micromachines to the interior of said tubular member.

23. The method of claim 1, including providing a supply of pest control material neutralizing agent within said micromachine, and exposing said pest control material to said neutralizing material to neutralize said pest control material.

24. The method of claim 23, including providing a thermally destructible barrier between said neutralizing material and said pest control material, and providing a battery, a second switch and an electrically energizable heat generating coil such that closure of said second switch will effect destruction of said barrier.

25. The method of claim 24, including energizing said second switch by RF energy.

26. The method of claim 1, including closing said switch after said micromachine has been transported by a pest.

27. The method of claim 1, including said pest control material being at least one material selected from the group consisting of pheromones, allomones, kairomones and hormones.

28. The method of claim 1, including said micromachine having a maximum dimension of about 1 to 2 mm.

29. Apparatus for controlling pests comprising a micromachine having a pest control material, a detonator, an explosive charge, a switch and a battery, and said detonator being structured to detonate said explosive charge responsive to closing of said switch to thereby initiate release of a quantity of said pest control material from said micromachine to initiate control of said pests.

30. The apparatus of claim 29, including said pest control material being a material for controlling rodent pests.

31. The apparatus of claim 30, including said switch being structured to be actuated by remote activation.

32. The apparatus of claim 31, including said switch being actuatable by RF transmitted signals.

33. The apparatus of claim 29, including a chemical sensor to activate said switch.

34. The apparatus of claim 33, including said switch being actuatable when said micromachine is in the gastrointestinal tract of said rodent pest.

35. The apparatus of claim 29, including a chemical sensor to activate said switch.

36. The apparatus of claim 35, including selecting said chemical sensor from the group consisting of pH sensors and glucose sensors.

37. The apparatus of claim 29, including said pest control material being disposed in a recess in said micromachine, and said explosive charge being positioned generally adjacent to said pest control material recess.

38. The apparatus of claim 37, including a frangible closure disposed over said pest control material containing recess, and said closure being structured to have its integrity destroyed by said explosion.

39. The apparatus of claim 29, including an attractant odorous material disposed within said micromachine, and said odor being releasable by employing means independent of said switch and battery and explosive charge.

40. The apparatus of claim 39, including an electrical resistance coil, a second switch and a battery energizing said electrical coil upon the closing of said second switch to generate heat, a closure over said attractant odorous material, and said coil being structured to destroy said closure by means of heat generated thereby.

41. The apparatus of claim 40, including said attractant odor being releasable before said release of said pest control material.

42. The apparatus of claim 40, including said switches being structured to be actuated by radio frequency energy, and a different frequency being employed as to each switch so that the sequence of switch closing can be controlled.

43. The apparatus of claim 29, including an RF transmitter disposed within said micromachine and having a battery and second switch operatively associated therewith.

44. The apparatus of claim 43, including closing said second switch to cause said transmitter to emit RF signals to facilitate locating the micromachine.

45. The apparatus of claim 29, including physical projections disposed on the exterior of said micromachine to facilitate pickup of the micromachine by said pest.

46. The apparatus of claim 45, including said projections being releasable from said pest so as to enhance the likelihood that a pest engaging in self-grooming will ingest the micromachine.

47. The apparatus of claim 29, including a plurality of said micromachines releasably secured to an article.

48. The apparatus of claim 47, including said article being a generally tubular member dimensioned such that a rodent pest passing therethrough will be likely to contact the interior walls thereof, and said micromachines being secured to interior walls of said tubular member.

49. The apparatus of claim 47, including employing a box as said article with openings dimensioned such that a rodent pest may enter and exit said box.

50. The apparatus of claim 48, including a plurality of micromachines secured to the interior of said tubular member.

51. The apparatus of claim 29, including a supply of pest control material neutralizing agent disposed within said micromachine, and said pest control material being disposed adjacent to said neutralizing agent.

52. The apparatus of claim 51, including a thermally destructible barrier between said neutralizing agent and said pest control material, and a battery, a second switch and an electrically energizable heat generating coil being operably associated with each other such that closure of said second switch will effect destruction of said barrier.

53. The apparatus of claim 52, including said second switch by being actuatable RF energy.

54. The apparatus of claim 29, including said switch being actuatable after said micromachine has been transported by a pest.

55. The apparatus of claim 29, including said pest control material being at least one material selected from the group consisting of pheromones, allomones, kairomones and hormones.

56. The apparatus of claim 29, including said micromachine having a maximum dimension of about 1 to 2 mm.

57. Apparatus for controlling pests including at least one micromachine having a pest control material releasably secured therein, said micromachine having at least one material selected from the group consisting of an attractant odor releasing material and a pest control material neutralizing material, a first switch actuatable to release said pest control material, and a second switch actuatable to release a material selected from the group consisting of said attractant order releasing material.

58. The apparatus of claim 57 including said pest control material being a rodent pest control material.

59. The apparatus of claim 57 including said micromachine having a plurality of pest engaging projections.

60. The apparatus of claim 58 including a plurality of said micromachines releasably secured to an article structured to be contacted by said rodent pest.

61. The apparatus of claim 60 including said article being a tube having said plurality of said micromachines releasably secured to the interior of said tube.

62. The apparatus of claim 60 including said article being a box having a plurality of said micromachines releasbly secured to the interior thereof.

63. The apparatus of claim 61 including said tube being structured to permit said rodent pest to pass therethrough.

64. The apparatus of claim 62 including said box being structured to permit said rodent to enter and exit said box.

* * * * *

UNITED STATES PATENT AND TRADEMARK OFFICE
CERTIFICATE OF CORRECTION

PATENT NO. : 6,581,324 B1  
DATED : June 24, 2003  
INVENTOR(S) : Samuel M. Creeger et al.

Page 1 of 1

It is certified that error appears in the above-identified patent and that said Letters Patent is hereby corrected as shown below:

<u>Column 12,</u>  
Lines 44 and 45, "Nosema Locustae" should read -- *Nosema Locustae* --.

<u>Column 22,</u>  
Line 31, "order" should read -- odor --.  
Line 32, after "material" insert, -- and said neutralizing materials --.

Signed and Sealed this

Eleventh Day of November, 2003

JAMES E. ROGAN  
*Director of the United States Patent and Trademark Office*